(12) United States Patent
Fransson et al.

(10) Patent No.: US 6,619,178 B1
(45) Date of Patent: Sep. 16, 2003

(54) METHOD FOR LAUNCHING COUNTER-MEASURES, AND ARRANGEMENT FOR STORING AND LAUNCHING COUNTER-MEASURES

(75) Inventors: Mats Fransson, Degerfors (SE); Ramses Salib, Solna (SE)

(73) Assignee: Saabtech Electronics AB, Järfälla (SE)

( * ) Notice: Subject to any disclaimer, the term of this patent is extended or adjusted under 35 U.S.C. 154(b) by 0 days.

(21) Appl. No.: 09/937,505
(22) PCT Filed: Mar. 29, 2000
(86) PCT No.: PCT/SE00/00608
§ 371 (c)(1), (2), (4) Date: Feb. 6, 2002
(87) PCT Pub. No.: WO00/59782
PCT Pub. Date: Oct. 12, 2000

(30) Foreign Application Priority Data

Apr. 1, 1999 (SE) ................................. 9901213

(51) Int. Cl.[7] .................................................. F41A 1/00
(52) U.S. Cl. ...................................... 89/1.51; 244/137.1
(58) Field of Search ................. 244/199, 136, 244/137.1, 200; 89/1.51, 1.52, 1.59; 102/505

(56) References Cited

U.S. PATENT DOCUMENTS

| | | | |
|---|---|---|---|
| 2,258,281 A | * | 10/1941 | Dunajeff |
| 2,395,547 A | * | 2/1946 | Hoiinowski |
| 3,459,099 A | * | 8/1969 | Litz et al. |
| 3,517,584 A | * | 6/1970 | Robinson et al. |
| 4,421,007 A | | 12/1983 | Hanes, Jr. |
| 4,524,670 A | * | 6/1985 | Billard et al. |
| 4,679,483 A | * | 7/1987 | Wrana |
| 4,696,442 A | * | 9/1987 | Mazzitelli |
| 5,136,951 A | * | 8/1992 | Herrlinger |
| 5,381,721 A | * | 1/1995 | Holmstrom et al. |
| 5,413,024 A | * | 5/1995 | Plummer |

FOREIGN PATENT DOCUMENTS

| | | |
|---|---|---|
| EP | 0278568 | 8/1988 |
| GB | 2138546 | 10/1984 |

* cited by examiner

*Primary Examiner*—Tien Dinh
(74) *Attorney, Agent, or Firm*—Swidler Berlin Shereff Friedman, LLP

(57) ABSTRACT

The present invention relates to a method and an arrangement for launching counter-measures, such as flares and chaff. According to the invention, the counter-measures are launched in a direction obliquely forwards and upwards relative to the aircraft and a low dynamic pressure is created across the dispenser's launch openings. The arrangement comprises compartments for counter-measures which are provided with openings and are intended for launching the counter-measures in a direction obliquely forwards and upwards relative to the aircraft. The invention increases the possibilities of releasing a target and reduces the noise levels of the sounds which can occur in emptied compartments.

19 Claims, 3 Drawing Sheets

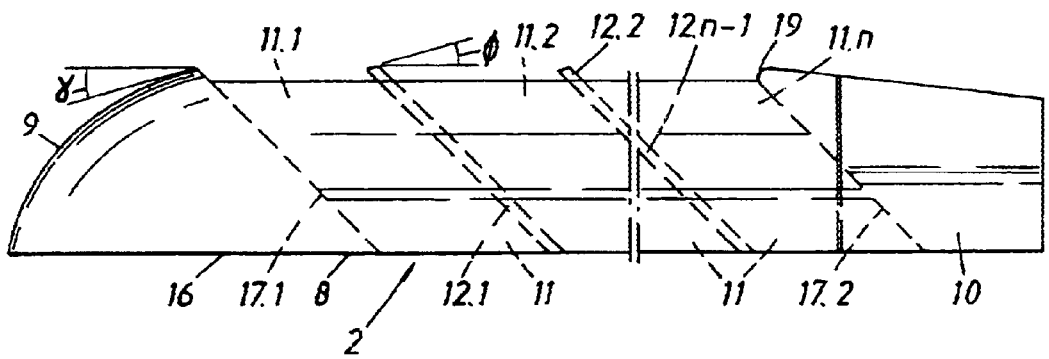
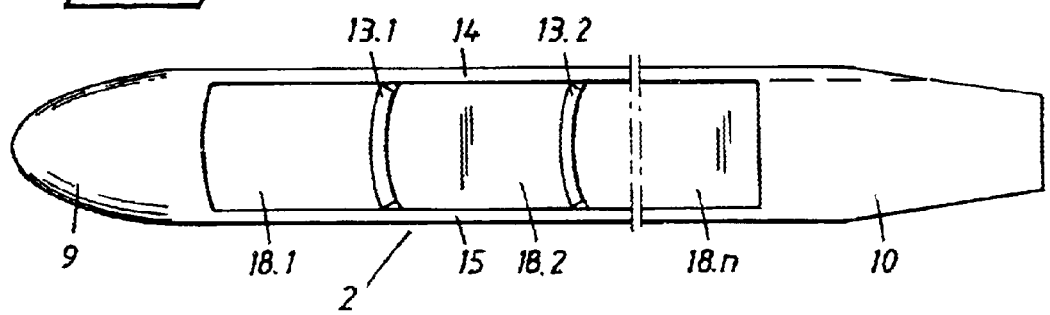
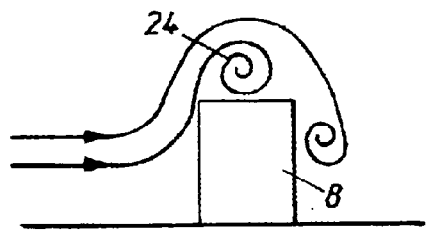
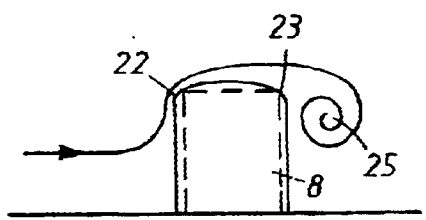

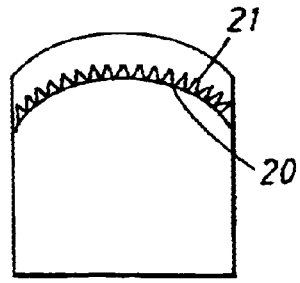
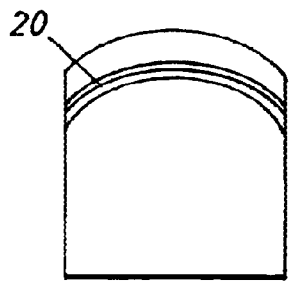
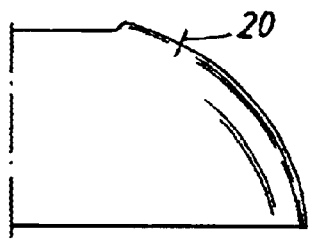
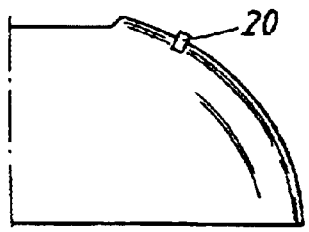
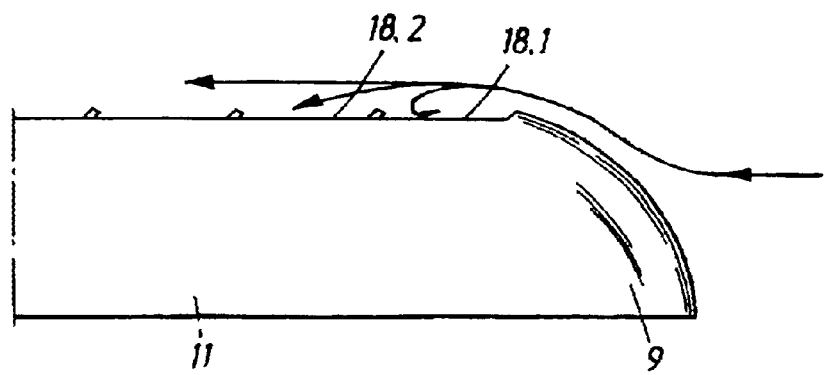

METHOD FOR LAUNCHING COUNTER-MEASURES, AND ARRANGEMENT FOR STORING AND LAUNCHING COUNTER-MEASURES

FIELD OF THE INVENTION

The present invention relates to a method for launching counter-measures, such as flares and chaff, from a dispenser which is mounted on an aircraft. The invention also relates to an arrangement for storing and launching counter-measures, such as flares and chaff, comprising an elongate body with a plurality of compartments which are provided with openings and are separated in the longitudinal direction of the elongate body by partition walls and are used for storing the counter-measures, the arrangement being designed to be mounted on an aircraft of the aeroplane type, with the longitudinal direction of the elongate body essentially coinciding with the flight direction of the aircraft, and the counter-measures being connected to a firing control unit for feeding firing signals to the counter-measures. The counter-measures can consist of passive means, such as chaff foil or metal-coated glass fibres, but can also consist of flares, for example IR flares, or other active measures.

BACKGROUND OF THE INVENTION

An example of a previously known arrangement or dispenser which is used for launching counter-measures and is provided with compartments is described in our own patent U.S. Pat. No. 4,679,483. In this case, the dispenser is configured and mounted on the aeroplane in such a way that the counter-measures are launched obliquely rearwards and downwards relative to the aeroplane.

Another example of a dispenser is known from U.S. Pat. No. 4,524,670. In this case, the dispenser is mounted on the underside of the aeroplane for launching the counter-measures downwards relative to the aeroplane.

The above two examples are examples of counter-measure dispensers which in historical terms have been able to function well, i.e. to successfully divert enemy attack, for example in the form of a target-seeking missile, towards the decoy target. However, over the course of time, target-seeking functions have been developed further, and there is now therefore a greater possibility of distinguishing the decoy target from the aeroplane. For example, the target seeker can be specifically programmed to handle the preliminary phase of activation of counter-measures. Information which can be used in this connection is the direction in which the counter-measures are launched relative to the aeroplane. In principle, the target seeker expects the counter-measures to be launched downwards, obliquely rearwards, or possibly rearwards.

A particular problem in launching flares is that the flares need time to develop into fully active decoy targets. There is a risk that the flares will only become fully active decoy targets at such a great distance from the aeroplane that a target seeker will be able to continue to follow the plane without any great problem.

SUMMARY OF THE INVENTION

One object of the present invention is to make available a method for launching counter-measures and an arrangement for storing and launching the counter-measures which increase the possibility, compared to known techniques, of avoiding threats, for example in the form of target-seeking missiles, enemy aircraft or the like.

Another object is to prevent the occurrence of vibration disturbances which are primarily caused by inherent oscillations in compartments which have been emptied of counter-measures.

The objects of the invention are achieved by means of a method which is characterized in that the counter-measures are launched in a direction obliquely forwards and upwards relative to the aircraft, and in that, in order to facilitate launching of the counter-measures, a low dynamic pressure is created permanently across the dispenser's launch openings by means of fixed means acting on the air stream, and also by means of an arrangement characterized in that the arrangement is designed to be mounted on the top of the aircraft, and in that the compartments are provided with openings and are intended for launching the counter-measures in a direction obliquely forwards and upwards relative to the aircraft. By launching the counter-measures in the direction in accordance with our invention, a separating procedure unknown to today's target seekers is obtained. Re-programming to the novel separation procedure is not a successful solution since it is then more difficult to identify previously known separation procedures. By launching the flares in the direction according to our invention, the flares have time to develop to fully active decoy targets before they pass the main heat source of the plane pertaining to the heat generation of the jet engines.

In this connection it may be noted that it is known per se to arrange a launching device on a plane which launches bombs or missiles obliquely forwards, see U.S. Pat. No. 3,517,584. The object of doing this is to effect launching which does not affect the plane's speed and position despite the fact that very heavy objects are being launched. The solution is based on launching the bombs or missiles obliquely forwards by controlling guide rails. As soon as the bombs or the missiles leave the guide rails and thus the discharge opening, they lie in a rearwardly directed trajectory relative to the aeroplane and are only then activated. During the actual launch phase for a missile or a bomb, a hatch is opened which in the opened state has the task of reducing the air resistance in the slipstream. The slipstream is employed to quickly lift missiles or bombs away from the discharge opening. When closed, the hatches form an even, streamlined structure.

This launching of bombs or missiles in accordance with the above paragraph cannot be compared with the arrangement according to the invention for launching counter-measures, such as flares and chaff. Where counter-measures are concerned, it is lighter objects that are being launched and these objects are activated directly or shortly after they have left the discharge opening and in a first stage act near the aeroplane to create a favourable starting point for misleading radar, IR target seekers, or the like. On discharge, the air stream is disturbed such that the counter-measures can be kept near the aeroplane for as long as possible. The air stream is lifted over the discharge opening in order to minimize impact or relative wind against the counter-measures and to prevent transmission of vibrations to the aeroplane.

The counter-measures can advantageously be launched obliquely forwards and upwards and to the side. By adding in a lateral component, the launched counter-measures can be guided out further from the main body of the aeroplane. Such an arrangement reduces the risks of inadvertent collisions occurring between counter-measures and aeroplane body.

The compartments are suitably designed to slope forwards 30° to 60° and preferably about 45° relative to the aircraft.

It should be emphasized here that it is not just the compartments which control the direction of launching. It also depends on how the counter-measures, preferably in cartridge form, are arranged in the compartments. The cartridges can to a certain extent be turned in the compartments. The inclination of the cartridges can be altered relative to the longitudinal and transverse walls of the compartments. In addition, the cartridges can be arranged to lie with the opening side essentially diagonal relative to the openings of the compartments. In principle, all geometrically possible positions can be considered for acting on the direction of launching and may be used.

To make it easier to launch the counter-measures obliquely forwards and upwards, the elongate body of the arrangement is provided with fixed means acting on the air stream in order to permanently create a low dynamic pressure across the compartment openings. This reduces the forces which act on the counter-measures during the phase when they leave the compartments of the elongate body via the compartment openings. The effect on the counter-measures during the launching phase is less, the result of which is that the launching force can be limited and the risks of damage to the counter-measures is reduced. For example, breaks on flares can be avoided.

When a compartment has been emptied of its contents of counter-measures, the compartment can act as a barrel which oscillates at its inherent frequency. Under unfavourable conditions, extremely high noise levels can occur. The creation of a low dynamic pressure across the compartment openings has been shown to effectively counteract oscillations caused by the inherent frequencies of the compartments, since the low dynamic pressure near the openings of the compartments means low energy.

Low dynamic pressure across the compartment openings can be created in a number of ways and, in particular, several measures can be combined to produce a low dynamic pressure across the whole row of compartment openings.

According to an advantageous embodiment, the means for creating a low dynamic pressure across the compartment openings comprise a finish towards the front compartment of the elongate body at an upwardly directed angle, preferably of the order of 15°, formed in the upper part of the front end of the elongate body.

According to another advantageous embodiment, the means for creating a low dynamic pressure across the compartment openings comprise partition walls with top parts shaped with an upwardly directed angle, preferably of the order of 15°. The partition walls are advantageously designed with a not inconsiderable thickness, preferably in the range of 10 to 30 mm, for example 15 mm.

According to a further advantageous embodiment, the means for creating a low dynamic pressure across the compartment openings comprise rounded edges designed in the transverse direction of the elongate body near the compartment openings.

According to yet another advantageous embodiment, the means for creating a low dynamic pressure across the compartment openings comprise spoiler elements arranged on the upper part of the front end of the elongate body.

BRIEF DESCRIPTION OF THE DRAWINGS

The invention will be described in greater detail below by way of illustration and with reference to the attached drawings, in which:

FIG. 2a shows a side view of an arrangement according to the invention for storing and launching counter-measures.

FIG. 2b shows a top view of the arrangement according to FIG. 2a.

FIG. 3a shows the cross-flow for a sharp-edged body.

FIG. 3b shows the cross-flow for an arrangement according to the invention with rounded edges at the openings of the body.

FIG. 4a shows a diagrammatic front view of an arrangement according to the invention provided with spoiler element.

FIG. 4b shows a partial diagrammatic side view of the arrangement according to FIG. 4a.

FIG. 5a shows a diagrammatic front view of an arrangement according to the invention, provided with spoiler element according to an alternative design.

FIG. 5b shows a partial diagrammatic side view of the arrangement according to FIG. 5a.

FIG. 6 shows an example of the flow across the top side of the front part of an arrangement according to the invention for storing and launching counter-measures.

DETAILED DESCRIPTION OF THE INVENTION

Figure 1A:
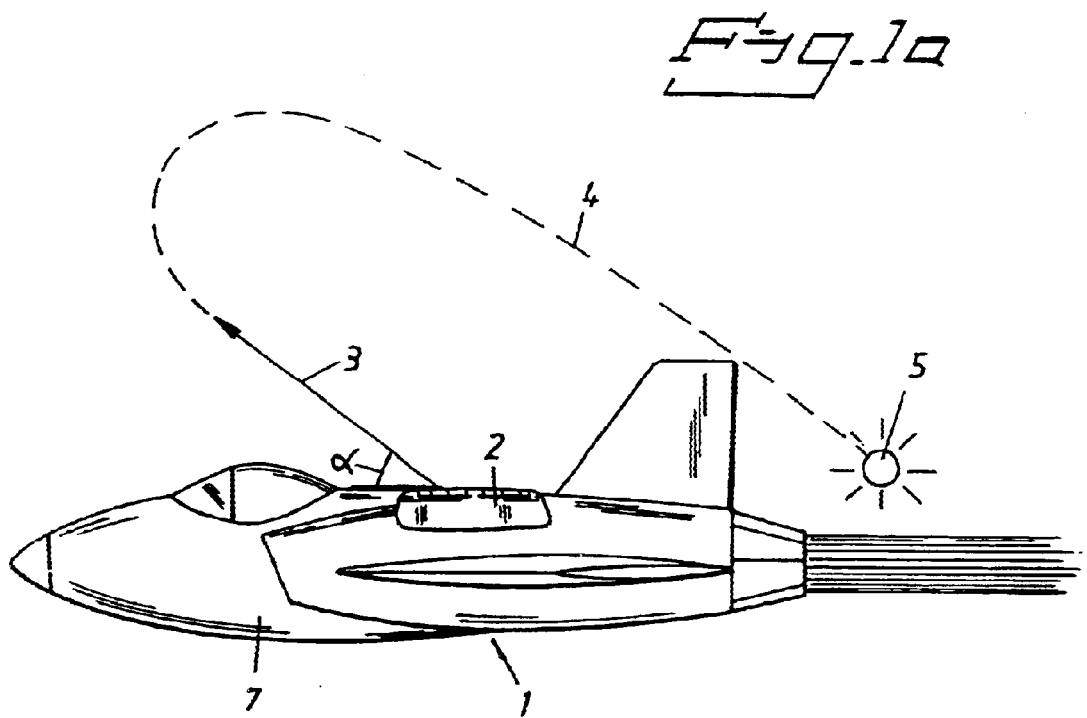
FIG. 1a shows a side view of an aeroplane provided with an arrangement according to the invention for storing and launching counter-measures.
Figure 1B:
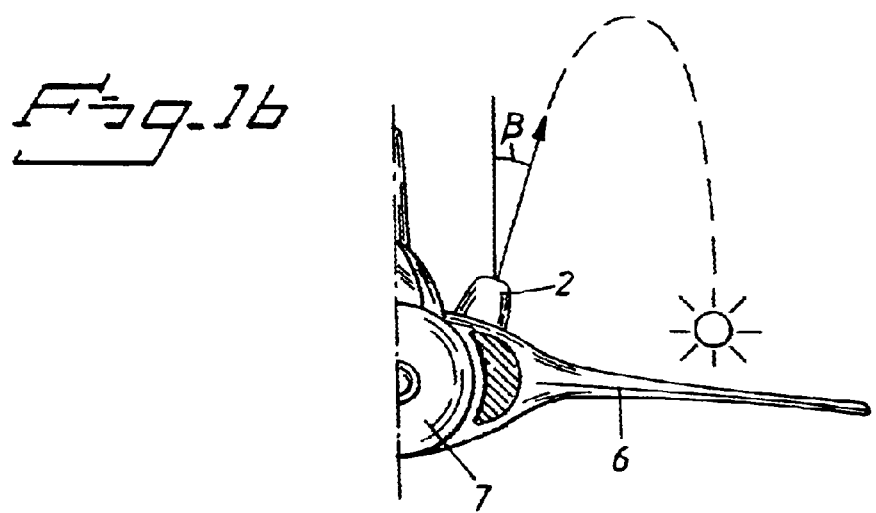
FIG. 1b shows a front view of one half of an aeroplane according to FIG. 1a with an arrangement according to the invention for storing and launching counter-measures.

The aeroplane 1 shown in FIGS. 1a and 1b is provided on the top with an arrangement for storing and launching counter-measures, hereinafter referred to as the dispenser 2. The dispenser has its longitudinal direction essentially coinciding with the longitudinal direction of the aeroplane. An arrow 3 designates the direction of launching from the dispenser. The letter α designates the launch angle relative to the direction or movement of the aeroplane when the counter-measures are launched obliquely forwards and upwards. The lateral angle when the counter-measures are launched with a lateral component has been indicated by β. The trajectory 4 for a launched flare 5 is indicated by a broken line. During the time from when a flare is activated for launch to when it reaches the position shown in FIGS. 1a and 1b, sufficient time has elapsed for the flare to have become a fully active decoy target in close proximity to the aeroplane. If this is compared with a launch directed obliquely rearwards in accordance with known principles, a very short time has elapsed at a corresponding distance of the flare from the aeroplane and an intelligent target-seeker cannot easily be misled. According to FIGS. 1a and 1b, the dispenser 2 is placed on a wing 6 near its attachment to the main body 7 of the aeroplane. In this context, it should be noted that the dispenser can also be placed further out on the wing 6 or directly on the main body 7 of the aeroplane.

The dispenser 2 is now described in more detail with reference to FIGS. 2a and 2b. The dispenser 2 comprises an elongate body 8 with a front part 9 and a rear part 10. Between the front part and rear part there is a compartment section 11 with a number of compartments 11.1, 11.2, . . . 11.n, intended to accommodate counter-measures in the form of preferably flares or chaff. The counter-measures are preferably accommodated in cartridges which can be of a type know in this field and will therefore not be discussed in detail here. The compartments can be of the same size or of different sizes and can accommodate identical or different types of counter-measures. Between each compartment there is a partition wall 12.1, 12.2, . . . 12.n−1. The partition walls are inclined at an angle of, for example, 45° relative to the longitudinal direction of the body. The partition walls have a not inconsiderable thickness, preferably in the range of 10 to 30 mm, for example 15 mm. By giving the partition walls a not inconsiderable thickness, the top part 13.1, 13.2, . . . 13.n–1 of each partition wall can be designed as a deflector in such a way that the partition wall at the top part finishes with an upwardly extending angle φ of the order of 15°. The compartments are delimited by the side walls 14, 15 of the elongate body 8 and its bottom section 16, and partition walls 12.1, 12.2, . . . 12.n–1 between the compartments and partition walls 17.1, 17.2 towards the front part 9 and rear part 10, respectively, of the elongate body. By means of the provision of partition walls and side walls, n openings 18.1, 18.2, . . . 18.n are formed.

In order to create low dynamic pressure across the openings of the compartments, the front part or nose 9 of the elongate body 8 is designed to finish towards the compartment section 11 with an upwardly extending angle γ, preferably of the order of 15°. The nose is streamlined and can be designed to follow elliptical shapes. The finish towards the compartment section creates a low dynamic pressure across the rearward openings and especially nearest to the nose. The design of the top parts of the successive partition walls 12.1, 12.2, . . . 12.n–1 maintains the low dynamic pressure across the succeeding openings 18.2, . . . 18.n. The rear part 10 of the elongate body 8 is designed narrowing towards the rear in order to reduce the air resistance and it has a deflector 19 near the compartment section 11 with an essentially radial curvature.

In addition to a flow running along the length of the dispenser 2, there are also flows running across the dispenser. In order to prevent vortices forming across the compartment openings in the manner illustrated in FIG. 3a for an angled formation with a vortex 24 across the openings, our dispenser is designed with rounded edges 22, 23 near the openings of the compartments. FIG. 3b illustrates the flow across the openings in our design, and the main vortex 25 arises to the side of the dispenser. The introduction of rounded edges means that the flow is separated at a flatter angle and thereby reaches the other edge before vortices form. By lowering the vortex towards the mounting surface for the dispenser, an additional effect is that the aerodynamic load on the dispenser is reduced and the effect on the aeroplane is reduced.

To create low dynamic pressure across the openings of the dispenser 2, FIGS. 4a, 4b and 5a, 5b show, respectively, examples of designs where the nose 9 has been provided with spoiler elements 20. In the design according to FIGS. 4a and 4b, spoiler elements in the form of projecting spikes 21 are proposed, while the design according to FIGS. 5a and 5b proposes a projecting edge formed to follow the shape of the nose. The two proposed embodiments have been found to have a good effect on the air stream in order to create the desired low dynamic pressure across the openings 18.1–18.n of the dispenser.

FIG. 6 shows diagrammatically how the flow across the openings 18.1, 18.2, . . . 18.n of the dispenser can appear. It should be noted here that the flow which is deflected by the nose 9 to some extent drops down again towards the opening of the first compartment 18.1 and to a lesser extent towards the second opening 18.2 of the compartment. This illustrates how the risks of interfering noise being generated are greatest in the first compartment 11.1, less in the second compartment 11.2 and much less in the succeeding compartments 11.3 to 11.n.

The invention is not limited to the illustrative embodiments described above, but can be modified within the scope of the attached patent claims and the inventive concept. For example, the shape and position of the spoiler elements can be varied within wide limits.

What is claimed is:

1. A method for launching counter-measures from a dispenser mounted on an aircraft, the method comprising:
    permanently creating a low dynamic pressure across launch openings of the dispenser with fixed members acting on an air stream flowing over the launch openings; and
    launching the counter-measures in a direction obliquely forwards and upwards relative to the aircraft and past a leading edge of said dispenser.

2. The method according to claim 1, wherein the counter-measures comprise at least one of flares and chaff.

3. The method according to claim 1, wherein the counter-measures are launched in a direction obliquely forward and upward and to the side relative to the aircraft.

4. An arrangement for storing and launching counter-measures, comprising:
    an elongate body operative to be mounted on an aircraft extending in a longitudinal direction of the aircraft, the elongate body including a plurality of compartments operative to store the counter-measures and launch the counter-measures in a direction obliquely forwards and upwards relative to the aircraft and past a leading compartment of said compartments, the compartments comprising launch openings and partition walls separating the compartments in a longitudinal direction of the elongate body; and
    a firing control unit operative to feed firing signals to the counter-measures.

5. The arrangement according to claim 4, wherein the counter-measures comprise at least one of flares and chaff.

6. The method according to claim 4, wherein the counter-measures are launched in a direction obliquely forward and upward and to the side relative to the aircraft.

7. The arrangement according to claim 4, wherein the compartments slope obliquely forward at an angle of 30° to 60° relative to the aircraft.

8. The arrangement according to claim 4, wherein the compartments slope obliquely forward at an angle of about 45° relative to the aircraft.

9. The arrangement according to claim 4, wherein the launch openings are operative to also launch the counter-measures to the side relative to the aircraft.

10. The arrangement according to claim 4, further comprising:
    a plurality of fixed members operative to act on an air stream flowing over the launch openings to permanently create a low dynamic pressure across launch openings to facilitate launching of the counter-measures.

11. The arrangement according to claim 10, wherein the members operative to act on the air stream comprise an upwardly angled surface on an upper part of a forward end of the elongate body.

12. The arrangement according to claim 11, wherein surface is angled at an angle of about 15°.

13. The arrangement according to claim 11, wherein the members operative to act on the air stream comprise upwardly angled ends on the partition walls.

14. The arrangement according to claim 13, wherein the ends of the partition walls are angled upward at an angle of about 15°.

15. The arrangement according to claim 11, wherein the members operative to act on the air stream comprise rounded edges in a transverse direction on the elongate body in the vicinity of the launch openings.

16. The arrangement according to claim 4, wherein the members operative to act on the air stream comprise spoiler elements arranged on an upper part of a front end of the elongate body.

17. The arrangement according to claim 4, wherein the partition walls have a thickness of 15 mm.

18. The arrangement according to claim 4, wherein the partition walls have a thickness of 10 mm to 30 mm.

19. An arrangement for storing and launching counter-measures, comprising:

an elongate body operative to be mounted on an aircraft extending in a longitudinal direction of the aircraft, the elongate body including a plurality of compartments operative to store the counter-measures and launch the counter-measures in a direction obliquely forwards and upwards relative to the aircraft and past a leading compartment of said compartments, the compartments comprising launch openings and partition walls separating the compartments in a longitudinal direction of the elongate body;

a plurality of fixed members operative to act on an air stream flowing over the launch openings to permanently create a low dynamic pressure across launch openings to facilitate launching of the counter-measures; and a firing control unit operative to feed firing signals to the counter-measures.

\* \* \* \* \*